United States Patent
Byun et al.

(10) Patent No.: US 9,577,229 B2
(45) Date of Patent: Feb. 21, 2017

(54) SECONDARY BATTERY

(75) Inventors: Sangwon Byun, Yongin-si (KR); Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/185,428

(22) Filed: Jul. 18, 2011

(65) Prior Publication Data

US 2012/0183841 A1    Jul. 19, 2012

(30) Foreign Application Priority Data

Jan. 13, 2011   (KR) .................. 10-2011-0003540

(51) Int. Cl.
  *H01M 2/02* (2006.01)
  *H01M 2/10* (2006.01)
  (Continued)

(52) U.S. Cl.
  CPC ............. *H01M 2/1072* (2013.01); *H01M 2/26* (2013.01); *H01M 2/263* (2013.01); *H01M 2/266* (2013.01);
  (Continued)

(58) Field of Classification Search
  CPC ........ Y02E 60/12; Y02E 60/122; H01M 4/00; H01M 10/0431; H01M 2/263; H01M 2/266; H01M 2/1072; H01M 2/26; H01M 10/052; H01M 10/0587
  (Continued)

(56) References Cited

U.S. PATENT DOCUMENTS

2003/0099880 A1*  5/2003  Park et al. .................... 429/211
2003/0224242 A1   12/2003 Kaito et al.
(Continued)

FOREIGN PATENT DOCUMENTS

EP   2 139 057 A1   12/2009
EP   2 372 808 A1   10/2011
(Continued)

OTHER PUBLICATIONS

KIPO Office Action dated Jun. 15, 2012, for corresponding Korean Patent Application No. 10-2011-0003540 (3 sheets).
(Continued)

*Primary Examiner* — Ula C Ruddock
*Assistant Examiner* — Lisa S Park
(74) *Attorney, Agent, or Firm* — Lewis Roca Rothgerber Christie LLP (57) ABSTRACT

A secondary battery includes an electrode assembly including a first electrode plate including a first electrode non-coating portion on which an active material of the first electrode plate is not coated, a second electrode plate including a second electrode non-coating portion on which an active material of the second electrode plate is not coated, and a separator between the first and second electrode plates; a collector electrically connected to an electrode non-coating portion of the first and second electrode non-coating portions, the collector including an insulation part at an insulation region of the collector adjacent the first and second electrode plates; and a case accommodating the electrode assembly and the collector.

11 Claims, 5 Drawing Sheets

(51) Int. Cl.
- *H01M 2/26* (2006.01)
- *H01M 10/04* (2006.01)
- *H01M 10/052* (2010.01)
- *H01M 10/0587* (2010.01)

(52) U.S. Cl.
CPC ....... *H01M 10/0431* (2013.01); *H01M 10/052* (2013.01); *H01M 10/0587* (2013.01); *Y02E 60/122* (2013.01)

(58) Field of Classification Search
USPC .......................................................... 429/163
See application file for complete search history.

(56) References Cited

U.S. PATENT DOCUMENTS

| | | | | |
|---|---|---|---|---|
| 2004/0191612 | A1* | 9/2004 | Akita et al. | 429/94 |
| 2005/0287431 | A1* | 12/2005 | Cho | 429/161 |
| 2006/0024578 | A1* | 2/2006 | Lee | 429/208 |
| 2007/0105015 | A1* | 5/2007 | Munenaga | H01M 2/0404 429/161 |

FOREIGN PATENT DOCUMENTS

| | | |
|---|---|---|
| KR | 10-2003-0081640 | 10/2003 |
| KR | 10-2007-0025722 | 3/2007 |

OTHER PUBLICATIONS

European Search Report dated Mar. 29, 2012, for corresponding European Patent application 11178652.1, 8 pages.
EPO Office action dated Mar. 20, 2014, for corresponding European Patent application 11178652.1, (5 pages).

\* cited by examiner

SECONDARY BATTERY

CROSS-REFERENCE TO RELATED APPLICATION

This application claims priority to and the benefit of Korean Patent Application No. 10-2011-0003540, filed in the Korean Intellectual Property Office on Jan. 13, 2011, the entire content of which is incorporated herein by reference.

BACKGROUND

1. Field

Aspects of embodiments of the present invention relate to a secondary battery.

2. Description of the Related Art

Secondary batteries are rechargeable unlike primary batteries. Among such secondary batteries, a low-capacity battery including a battery cell in the form of a pack may be used for small portable electronic devices such as cellular phones and camcorders, and a high-capacity battery including dozens of battery cells connected to one another may be used as a motor-driving power source such as for electric scooters, hybrid vehicles, or electric vehicles.

Secondary batteries are manufactured in various shapes, such as a cylindrical shape and a prismatic shape. A secondary battery may be manufactured by placing an electrode assembly formed by disposing an insulating separator between a positive electrode plate and a negative electrode plate in a case together with electrolyte, and disposing a cap plate on the case. The electrode assembly is connected to positive and negative terminals which protrude from the cap plate and are exposed to the exterior of the secondary battery.

SUMMARY

According to an aspect of embodiments of the present invention, a secondary battery is configured to prevent or substantially prevent a short circuit even when the secondary battery is crushed.

According to at least one embodiment of the present invention, a secondary battery includes: an electrode assembly including a first electrode plate including a first electrode non-coating portion on which an active material of the first electrode plate is not coated, a second electrode plate including a second electrode non-coating portion on which an active material of the second electrode plate is not coated, and a separator between the first and second electrode plates; a collector electrically connected to an electrode non-coating portion of the first and second electrode non-coating portions, the collector including an insulation part at an insulation region of the collector adjacent the first and second electrode plates; and a case accommodating the electrode assembly and the collector.

In one embodiment, the collector is welded to the electrode non-coating portion at a connection region of the collector, and the connection region is spaced apart from the insulation region.

The insulation part may include at least one of an anodizing layer or an insulation tape layer.

The secondary battery may further include an electrode terminal electrically connected to the collector, and the collector may include a first connection part connected to the electrode terminal, and a second connection part extending from a lateral end of the first connection part and connected to the electrode non-coating portion.

A partial region of the second connection part may be welded to the electrode non-coating portion, and the insulation part may be at another region of the second connection part that is not welded to the electrode non-coating portion and is adjacent the first and second electrode plates. The insulation part may include at least one of an anodizing layer or an insulation tape layer.

The insulation part may be at edge portions of the second connection part that are adjacent the first and second electrode plates.

The second connection part may be connected to both sides of an end of the electrode non-coating portion such that the end of the electrode non-coating portion is arranged within the second connection part.

In one embodiment, a partial region of the second connection part is welded to the electrode non-coating portion, and the insulation part is on the entire second connection part other than the partial region that is welded to the electrode non-coating portion.

In one embodiment, the second connection part includes a pair of second connection parts, each including an inner surface facing the inner surface of the other of the pair of second connection parts, and at least a partial region of each of the inner surfaces is welded to the electrode non-coating portion. The insulation part may be on the entire inner surfaces of the second connection parts other than the partial region that is welded to the electrode non-coating portion.

The secondary battery may further include a cap plate sealing the case; an electrode terminal electrically connected to the collector; and an insulation member arranged among the collector, a cap plate, and the electrode terminal.

In one embodiment, the collector is electrically connected to the first electrode non-coating portion, and the secondary battery further includes another collector electrically connected to the second electrode non-coating portion and including an insulation part at an insulation region of the another collector adjacent the first and second electrode plates. The another collector may be welded to the second electrode non-coating portion at a connection region of the another collector, and the connection region may be spaced apart from the insulation region of the another collector.

BRIEF DESCRIPTION OF THE DRAWINGS

The accompanying drawings are included to provide a further understanding of the present disclosure, and are incorporated in and constitute a part of this specification. The drawings illustrate some exemplary embodiments of the present invention and, together with the description, serve to explain principles of the present invention. In the drawings.

DETAILED DESCRIPTION

Some exemplary embodiments of the present invention will now be described more fully hereinafter with reference to the accompanying drawings; however, they may be embodied in different forms and should not be construed as limited to the embodiments set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Throughout the following description, like reference numerals designate elements having like functions and operations. In addition, when a part is referred to as being electrically connected to another part, it is to be understood that the part can be directly connected to the other part, or intervening parts may also be present.

Figure 1:
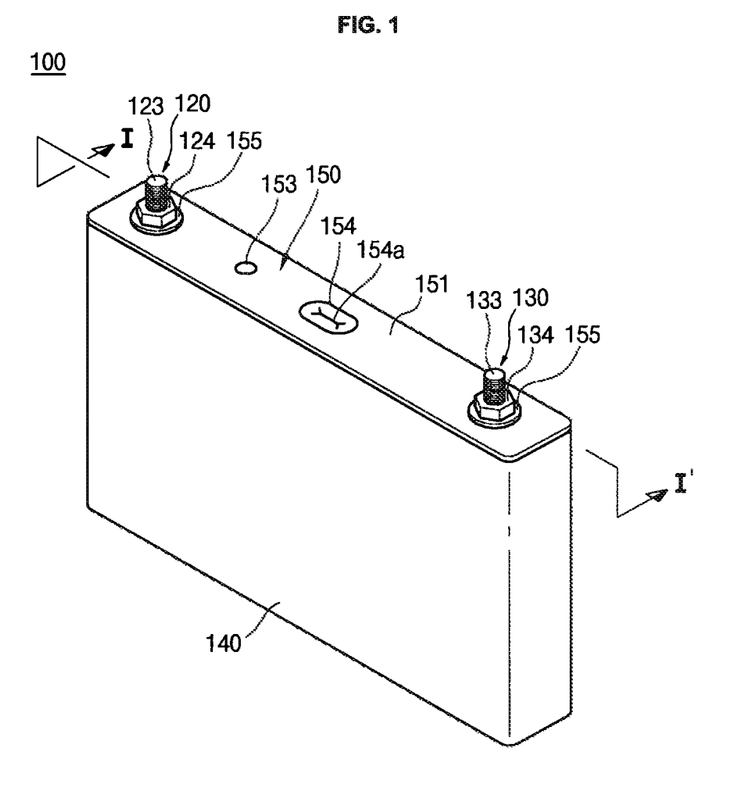
FIG. 1 is a perspective view of a secondary battery according to an embodiment of the present invention.
Figure 2:
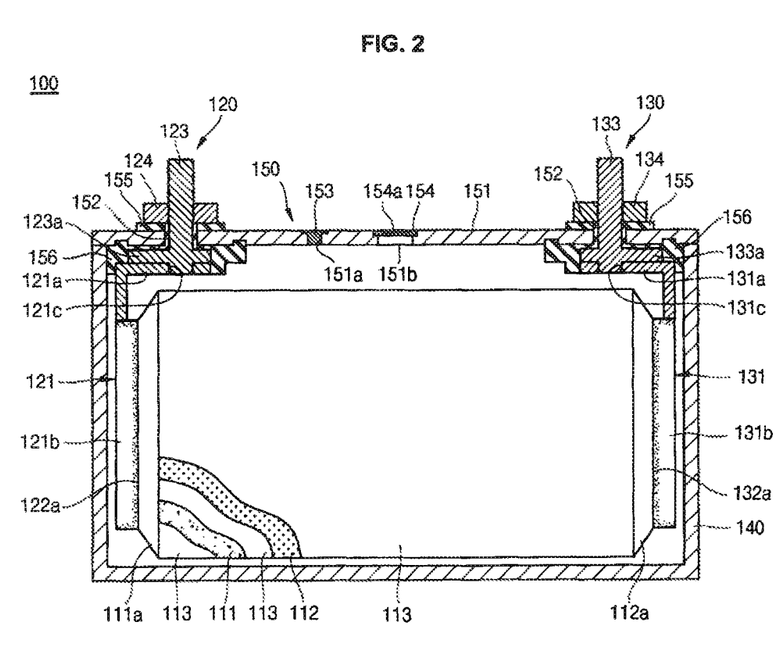
FIG. 2 is a sectional view of the secondary battery of FIG. 1, taken along the line I-I'.
Figure 3:
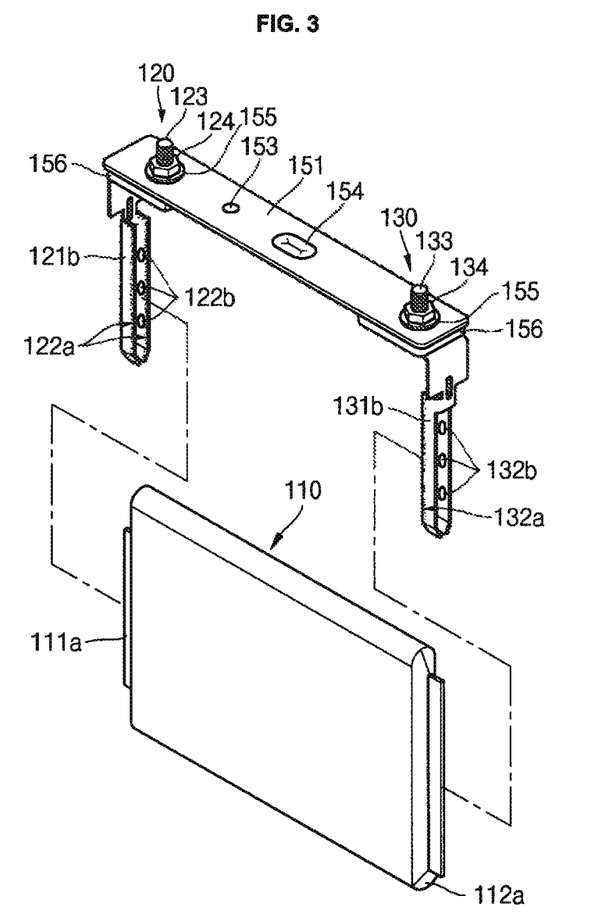
FIG. 3 is an exploded perspective view of the secondary battery of FIG. 1.
Figure 4:
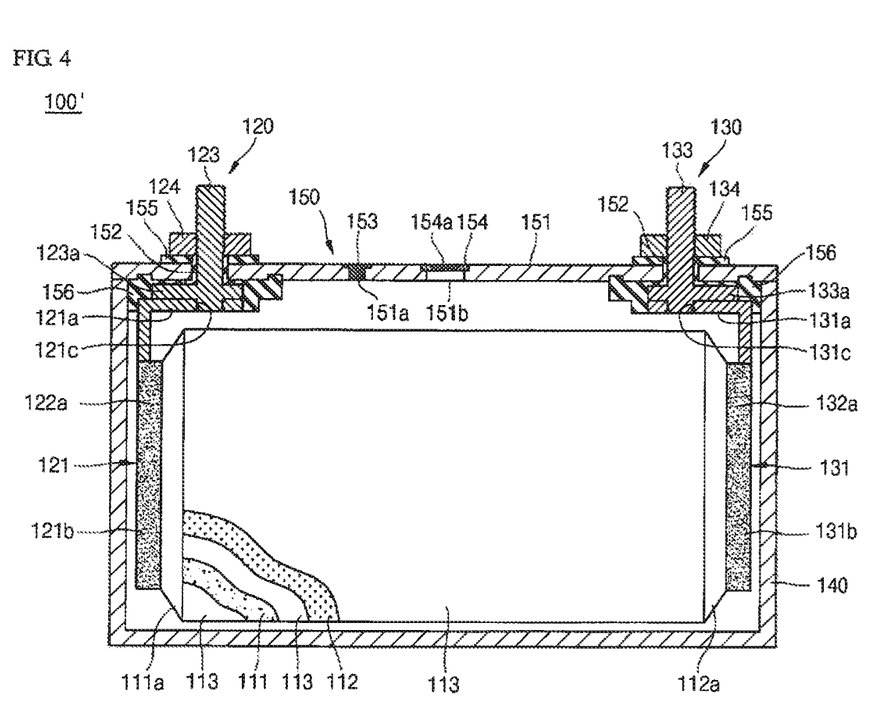
FIG. 4 is a sectional view of a secondary battery according to another embodiment of the present invention.
Figure 5:
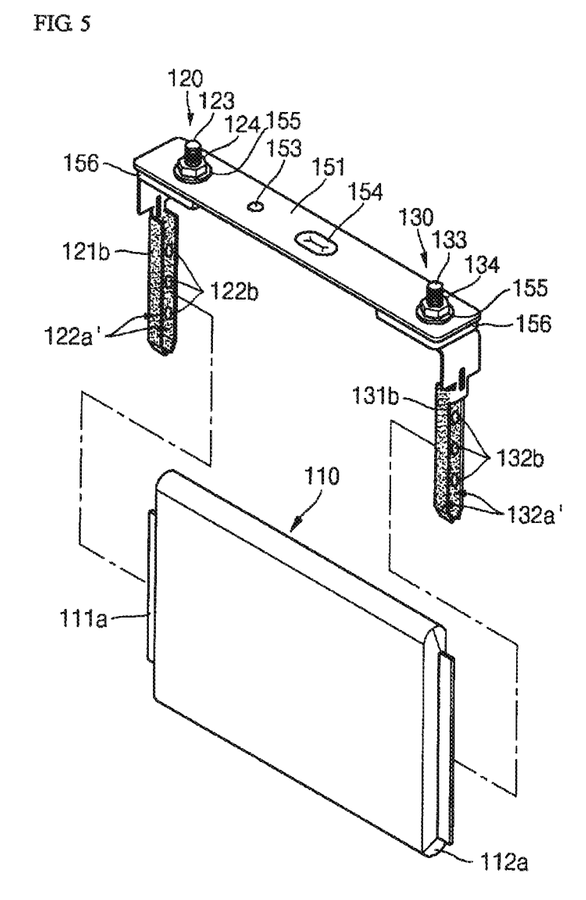
FIG. 5 is an exploded perspective view of the secondary battery of FIG. 4.

FIG. 1 is a perspective view illustrating a secondary battery 100 according to an embodiment of the present invention. FIG. 2 is a sectional view of the secondary battery 100 taken along line I-I' of FIG. 1. FIG. 3 is an exploded perspective view illustrating the secondary battery 100 with a case of the secondary battery 100 not shown for purposes of illustration. FIG. 4 is a sectional view illustrating a secondary battery according to another embodiment of the present invention. FIG. 5 is an exploded perspective view illustrating the secondary battery of FIG. 4 with a case of the secondary battery not shown for purposes of illustration.

Referring to FIGS. 1 through 3, the secondary battery 100 according to an embodiment of the present invention includes an electrode assembly 110, a first terminal part 120, a second terminal part 130, a case 140, and a cap assembly 150.

The electrode assembly 110 may be formed by winding or stacking a first electrode plate 111, a separator 113, and a second electrode plate 112, which have a thin plate or film shape. The first electrode plate 111 may function as a positive electrode, and the second electrode plate 112 may function as a negative electrode. Alternatively, the first electrode plate 111 may function as a negative electrode, and the second electrode plate 112 may function as a positive electrode.

The first electrode plate 111 is formed by applying a first electrode active material, such as a transition metal oxide, on a first electrode collector formed of metal foil, such as aluminum foil. The first electrode plate 111 includes a first electrode non-coating portion 111a on which the first electrode active material is not applied. The first electrode non-coating portion 111a functions as a current flow path between the first electrode plate 111 and the outside of the first electrode plate 111. However, in embodiments of the first electrode plate 111 according to the present invention, materials that can be used to form the first electrode plate 111 are not limited to the above-mentioned materials but, rather, may include any other suitable materials.

The second electrode plate 112 is formed by applying a second electrode active material, such as graphite or carbon, on a second electrode collector formed of metal foil, such as nickel or copper foil. The second electrode plate 112 includes a second electrode non-coating portion 112a on which the second electrode active material is not applied. The second electrode non-coating portion 112a functions as a path for a current between the second electrode plate 112 and the outside of the second electrode plate 112. However, in embodiments of the second electrode plate 112 according to the present invention, materials that can be used to form the second electrode plate 112 are not limited to the above-mentioned materials but, rather, may include any other suitable materials.

The polarities of the first and second electrode plates 111 and 112 may be interchanged with each other. That is, the first electrode plate 111 may be a positive electrode, and the second electrode plate 112 may be a negative electrode. Alternatively, the first electrode plate 111 may be a negative electrode, and the second electrode plate 112 may be a positive electrode.

The separator 113 may be disposed between the first electrode plate 111 and the second electrode plate 112 to prevent or substantially prevent a short circuit and allow movement of lithium ions. The separator 113 may be formed of a polyethylene film, a polypropylene film, or a film including polyethylene and polypropylene. However, in embodiments of the separator 113 according to the present invention, materials that can be used to form the separator 113 are not limited to the above-mentioned materials but, rather, may include any other suitable materials.

The first and second terminal parts 120 and 130 are coupled to both end parts of the electrode assembly 110 in a manner such that the first and second terminal parts 120 and 130 are electrically connected to the first and second electrode plates 111 and 112, respectively.

The electrode assembly 110 is accommodated in the case 140 together with electrolyte. The electrolyte may include an organic solvent, such as ethylene carbonate (EC), propylene carbonate (PC), diethyl carbonate (DEC), ethyl methyl carbonate (EMC), and dimethyl carbonate (DMC); and a lithium salt such as LiPF6 or LiBF4. The electrolyte may be liquid, solid, or gel.

The first terminal part 120, in one embodiment, is formed of a metal or an equivalent thereof, and is electrically connected to the first electrode plate 111. The first terminal part 120, in one embodiment, includes a first collector 121, a first electrode terminal 123, and a first coupling member 124.

The first collector 121 contacts the first electrode non-coating portion 111a protruding from an end of the electrode assembly 110. In one embodiment, the first collector 121 is welded to the first electrode non-coating portion 111a. The first collector 121 may have a generally reverse L-shape, and a terminal hole 121c may be formed in an upper portion of the first collector 121. The first electrode terminal 123, in one embodiment, is fitted and coupled to the terminal hole 121c. The first collector 121 may be formed of aluminum or an aluminum alloy. However, the material of the first collector 121 is not limited thereto and, in other embodiments, the first collector 121 may be formed of any other suitable material.

In one embodiment, the first collector 121 includes a first connection part 121a and a second connection part 121b.

The first connection part 121a, in one embodiment, includes the terminal hole 121c and is coupled to the first electrode terminal 123 through the terminal hole 121c. The first connection part 121a may be horizontally positioned.

The second connection part 121b, in one embodiment, is bent perpendicularly from both sides of an end of the first connection part 121a and extends a predetermined length from the first connection part 121a. That is, the second connection part 121b may be vertically positioned.

In one embodiment, the second connection part 121b includes mutually-facing parts, and some regions of inner surfaces of the mutually-facing parts are welded to the first electrode non-coating portion 111a. As shown in FIG. 3, the regions (hereinafter referred to as first welding regions 122b) of the inner surfaces of the mutually-facing parts of the second connection part 121b are welded to some regions of both sides of the first electrode non-coating portion 111a. That is, the first collector 121 and the first electrode non-coating portion 111a are physically and electrically connected to each other through the first welding regions 122b. First insulation parts 122a may be formed on surface portions of non-welding regions of the second connection part 121b. The surface portions of the non-welding regions of the second connection part 121b are close to or adjacent the first and second electrode plates 111 and 112 of the electrode assembly 110. Specifically, the surface portions of the non-welding regions, in one embodiment, are lateral end portions of the second connection part 121b. That is, the surface portions of the non-welding regions are edge portions of the second connection part 121b close to or adjacent the electrode assembly 110. The first insulation parts 122a may be formed by forming anodizing layers, insulation tape layers, or anodizing layers and insulation tape layers on the edge portions of the second connection part 121b.

In one embodiment, an insulation part (not shown) may also be formed on a lower surface of the first connection part 121a.

In secondary batteries, thinner cases and cap plates may be used to reduce the weights of the secondary batteries. However, the strength of the secondary batteries is lowered due to the thinner parts. Particularly, under a y-axis crush condition of a collector, the collector may make contact with an electrode plate having a polarity different from that of the collector and cause a short circuit. For example, in the secondary battery 100, since the first electrode non-coating portion 111a is formed of thin metal foil, a part of the first electrode non-coating portion 111a may be torn by an edge of the first collector 121 when the secondary battery 100 is crushed by an impact. In this case, the inside of the electrode assembly 110 may be opened, and the second connection part 121b may make contact with the second electrode plate 112 through the opened part of the electrode assembly 110 to cause a short circuit. However, due to the first insulation parts 122a formed on the second connection part 121b, a short circuit may be prevented or substantially prevented even though the first collector 121 and the second electrode plate 112 are brought into contact with each other due to crushing of the secondary battery 100. In one embodiment, due to the insulation part (not shown) formed on a lower surface of the first connection part 121a, a short circuit may also be prevented or substantially prevented.

The first electrode terminal 123, in one embodiment, penetrates a cap plate 151 of the cap assembly 150 and protrudes upward by a predetermined length. The first electrode terminal 123 is electrically connected to the first connection part 121a of the first collector 121 at a bottom side of the cap plate 151. The first electrode terminal 123 extends and protrudes upward from the cap plate 151 by a predetermined length and, in one embodiment, the first electrode terminal 123 includes a first flange 123a at a position under the cap plate 151 so that the first electrode terminal 123 cannot be separated from the cap plate 151. In one embodiment, a part of the first electrode terminal 123 below the first flange 123a is inserted in the terminal hole 121c of the first connection part 121a and is fixed to the terminal hole 121c by riveting or welding. A part of the first electrode terminal 123 above the first flange 123a is inserted through the cap plate 151 and protrudes upward by a predetermined length. The first coupling member 124 may be fixed to the protruding part of the first electrode terminal 123. A screw thread may be formed on the protruding part of the first electrode terminal 123 so that the first coupling member 124 may be screw-coupled to the protruding part of the first electrode terminal 123. The first electrode terminal 123 may be electrically insulated from the cap plate 151. The first electrode terminal 123 may be formed of aluminum, aluminum alloy, or an equivalent thereof. However, the material of the first electrode terminal 123 is not limited thereto and, in other embodiments, the first electrode terminal 123 may be formed of any other suitable material.

The first coupling member 124 may have a hexagonal nut shape, and a vertical penetration hole may be formed through the center of the first coupling member 124 so that the first electrode terminal 123 can be inserted through and coupled with the first coupling member 124. The first coupling member 124 may be formed of stainless steel, aluminum, aluminum alloy, copper, copper alloy, or an equivalent thereof. However, the material of the first coupling member 124 is not limited thereto and, in other embodiments, the first coupling member 124 may be formed of any other suitable material. The first coupling member 124 and the cap plate 151 may be insulated from each other.

The second terminal part 130, in one embodiment, is formed of a metal or an equivalent thereof, and is electrically connected to the second electrode plate 112. The second terminal part 130, in one embodiment, includes a second collector 131, a second electrode terminal 133, and a second coupling member 134. The second terminal part 130, in one embodiment, has a same shape as that of the first terminal part 120. Therefore, a detailed description thereof will not be repeated.

The second collector 131, in one embodiment, has substantially a same structure as that of the first collector 121. In one embodiment, the second collector 131 includes a first connection part 131a and a second connection part 131b.

The first connection part 131a, in one embodiment, includes a terminal hole 131c and is coupled to the second electrode terminal 133 through the terminal hole 131c. The first connection part 131a may be horizontally positioned.

The second connection part 131b, in one embodiment, is bent perpendicularly from both sides of an end of the first connection part 131a and extends a predetermined length from the first connection part 131a. That is, the second connection part 131b may be vertically positioned.

In one embodiment, the second connection part 131b includes mutually-facing parts, and some regions of inner surfaces of the mutually-facing parts are welded to the second electrode non-coating portion 112a. As shown in FIG. 3, the regions (hereinafter referred to as second welding regions 132b) of the inner surfaces of the mutually-facing parts of the second connection part 131b are welded to some regions of both sides of the second electrode non-coating portion 112a. That is, the second collector 131 and the second electrode non-coating portion 112a are physically and electrically connected to each other through the second welding regions 132b. Second insulation parts 132a may be formed on surface portions of non-welding regions of the second connection part 131b. The surface portions of the non-welding regions of the second connection part 131b are close to or adjacent the first and second electrode plates 111 and 112 of the electrode assembly 110. Specifically, the surface portions of the non-welding regions, in one embodiment, are lateral end portions of the second connection part 131b. That is, the surface portions of the non-welding regions are edge portions of the second connection part 131b close to or adjacent the electrode assembly 110. The second insulation parts 132a may be formed of anodizing layers, insulation tape layers, or anodizing layers and insulation tape layers, for example, on the edge portions of the second connection part 131b.

In one embodiment, an insulation part (not shown) may also be formed on a lower surface of the first connection part 131a.

Since the second electrode non-coating portion 112a is also formed of thin metal foil, a part of the second electrode non-coating portion may be damaged or torn if the secondary battery 100 is crushed, as described above. Therefore, if the secondary battery 100 is crushed, the second electrode non-coating portion 112a may be partially opened, and the second collector 131 and the first electrode plate 111 may make contact with each other through the opened part of the second electrode non-coating portion 112a. For example, an edge portion of the second connection part 131b may make contact with the first electrode plate 111. However, due to the second insulation parts 132a formed on the second connection part 131b, a short circuit may be prevented or substantially prevented even though the second collector 131 and the first electrode plate 111 are brought into contact with each other due to crushing of the secondary battery 100.

The second collector 131 and the second electrode terminal 133 may be formed of copper, a copper alloy, or an equivalent thereof. However, the materials of the second collector 131 and the second electrode terminal 133 are not limited thereto and, in other embodiments, the second collector 131 and the second electrode terminal 133 may be formed of any other suitable materials. The second coupling member 134 may be formed of stainless steel, aluminum, aluminum alloy, copper, copper alloy, or an equivalent thereof. However, the material of the second coupling member 134 is not limited thereto and, in other embodiments, the second coupling member 134 may be formed of any other suitable material.

As described above, in one embodiment, the insulation parts 122a and 132a are formed on the edge portions of the non-welding regions of the second connection parts 121b and 131b which are close to the electrode assembly 110. According to another embodiment of the present invention, as shown in FIGS. 4 and 5, a secondary battery 100' includes insulation parts 122a' and 132a' that are formed on entire non-welding regions of the second connection parts 121b and 131b.

The case 140, in one embodiment, is formed of a conductive metal such as aluminum, aluminum alloy, or steel plated with nickel. The case 140 may have a generally hexahedral shape with an opening so that the electrode assembly 110, the first terminal part 120, and the second terminal part 130 can be inserted and placed in the case 140. In FIGS. 1 and 2, a state where the case 140 and the cap assembly 150 are coupled to each other is shown, and the opening of the case 140 is not shown. In one embodiment, a size and shape of the peripheral part of the cap assembly 150 substantially corresponds to the opening. An inner surface of the case 140 may be treated to be electrically insulated from the electrode assembly 110, the first terminal part 120, the second terminal part 130, and the cap assembly 150.

The cap assembly 150 is coupled to the case 140. In one embodiment, the cap assembly 150 includes the cap plate 151, sealing gaskets 152, a plug 153, a safety vent 154, upper insulation members 155, and lower insulation members 156. Alternatively, the sealing gaskets 152, the upper insulation members 155, and the lower insulation members 156 may be considered as elements of the first and second terminal parts 120 and 130.

The cap plate 151 closes the opening of the case 140. In one embodiment, for example, the cap plate 151 may be coupled to the case 140 by laser welding. The cap plate 151 may be formed of the same material as that used to form the case 140. In one embodiment, the cap plate 151 is electrically connected to the first terminal part 120 and has the same polarity as that of the first terminal part 120. In one embodiment, the cap plate 151 and the case 140 may have the same polarity.

The sealing gaskets 152, in one embodiment, are formed of an insulating material and are disposed between the cap plate 151 and the first and second electrode terminals 123 and 133 to seal the gaps between the cap plate 151 and the first and second electrode terminals 123 and 133. The sealing gaskets 152 prevent or reduce permeation of moisture into the secondary battery 100 or leakage of electrolyte from the inside of the secondary battery 100.

The plug 153 closes an electrolyte injection hole 151a of the cap plate 151. In one embodiment, the safety vent 154 is disposed on a vent hole 151b of the cap plate 151, and a notch 154a is formed in the safety vent 154 so that the safety vent 154 can be opened at a preset pressure.

The upper insulation members 155, in one embodiment, are disposed between the cap plate 151 and the first and second coupling members 124 and 134. In addition, the upper insulation members 155 make tight contact with the cap plate 151. Furthermore, the upper insulation members 155 may make tight contact with the sealing gaskets 152. The upper insulation members 155 insulate the cap plate 151 from the first and second coupling members 124 and 134.

The lower insulation members 156, in one embodiment, are disposed between the cap plate 151 and the first and second collectors 121 and 131 to prevent or substantially prevent an unnecessary short circuit. That is, the lower insulation members 156 prevent or substantially prevent a short circuit between the first collector 121 and the cap plate 151 and a short circuit between the second collector 131 and the cap plate 151. The lower insulation members 156 are also disposed between the cap plate 151 and the first and second electrode terminals 123 and 133 so that a short circuit can be prevented or substantially prevented between the cap plate 151 and the first and second electrode terminals 123 and 133.

According to embodiments of the present invention, even where the secondary battery 100, 100' is crushed and the electrode assembly 110 is damaged, a short circuit may be prevented or substantially prevented between the collectors 121 and 131 and the electrode plates 111 and 112 due to the insulation parts formed on the collectors 121 and 131. Therefore, the secondary battery 100, 100' may be used stably.

As described above, in a secondary battery according to embodiments of the present invention, a short circuit is prevented or substantially prevented even when the secondary battery is crushed.

Some exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising: an electrode assembly comprising a first electrode plate comprising a first electrode coating portion on which a first active material of the first electrode plate is coated and a first electrode non-coating portion on which the first active material of the first electrode plate is not coated at a first end of the electrode assembly; a second electrode plate comprising a second electrode coating portion on which a second active material of the second electrode plate is coated and a second electrode non-coating portion on which the second active material of the second electrode plate is not coated at a second end of the electrode assembly opposite the first end, wherein the first and second ends oppose each other across the length of the electrode assembly, the length being greater than the width of the electrode assembly; and a separator between the first and second electrode plates; a collector comprising a connection part physically and electrically connected to an outer surface of the first electrode non-coating portion; and an insulation part directly formed on ah edge of the connection part at an insulation region of the collector adjacent the first and second electrode plates, wherein the edge of the connection part is nearer to the second end of the electrode assembly than is an opposing edge of the connection part, wherein the edge of the connection part is between the first end and the second end of the electrode assembly and faces away from the first end, and wherein the insulation part directly formed on the edge covers the edge and is located between the edge and the second end along a longitudinal axis of the electrode assembly extending from the first end to the second end; and a case accommodating the electrode assembly and the collector, wherein the collector is welded to the first electrode non-coating portion at a connection region of a first surface of the collector connection part, the edge on which the insulation part is directly formed being a lateral edge extended from the first surface to a second surface of the connection part opposite the first surface, the connection region being spaced apart; from the insulation region, wherein the insulation part comprises at least one of an anodizing layer or an insulation tape layer.

2. The secondary battery as claimed in claim 1, further comprising an electrode terminal electrically connected to the collector, and wherein the connection part comprises:
   a first connection part connected to the electrode terminal; and
   a second connection part extending from a lateral end of the first connection part and connected to the first electrode non-coating portion.

3. The secondary battery as claimed in claim 2,
   wherein a partial region of the second connection part is welded to the first electrode non-coating portion, and
   wherein the insulation part is at another region of the second connection part that is not welded to the first electrode non-coating portion and is adjacent the first and second electrode plates.

4. The secondary battery as claimed in claim 3, wherein the insulation part is at edge portions of the second connection part, that are adjacent the and second electrode plates.

5. The secondary battery as claimed in claim 2, wherein the second connection part is connected to both sides of an end of the first electrode non-coating portion such that the end of the first electrode non-coating portion is arranged within the second connection part.

6. The secondary battery as claimed in claim 2,
   wherein a partial region of the second connection part is welded to the first electrode non-coating portion, and
   wherein the insulation part is on the entire second connection part other than the partial region that is welded to the first electrode non-coating portion.

7. The secondary battery as claimed in claim 2,
   wherein the second connection part comprises a pair of second connection parts, each including an inner surface facing the inner surface of the other of the pair of second connection parts, and
   wherein at least a partial region of each of the inner surfaces is welded to the electrode non-coating portion.

8. The secondary battery as claimed in claim 7, wherein the insulation part is on the entire inner surfaces of the second connection parts other than the partial region that is welded to the first electrode non-coating portion.

9. The secondary battery as claimed in claim 1, further comprising:
   a cap plate sealing the case;
   an electrode terminal electrically connected to the collector; and
   an insulation member arranged among the collector the cap plate, and the electrode terminal.

10. The secondary battery as claimed in claim 1, wherein the secondary battery further comprises another collector electrically connected to the second electrode non-coating portion and comprising an insulation part at an insulation region of the another collector adjacent the first and second electrode plates.

11. The secondary battery as claimed in claim 10, wherein the another collector is welded to the second electrode non-coating portion at a connection region of the another collector, the connection region of the another collector being spaced apart from the insulation region of the another collector.

* * * * *

UNITED STATES PATENT AND TRADEMARK OFFICE
CERTIFICATE OF CORRECTION

PATENT NO.         : 9,577,229 B2                              Page 1 of 1
APPLICATION NO.    : 13/185428
DATED              : February 21, 2017
INVENTOR(S)        : Sangwon Byun et al.

It is certified that error appears in the above-identified patent and that said Letters Patent is hereby corrected as shown below:

In the Claims

| | |
|---|---|
| Column 9, Line 11, Claim 1 | delete "ah" insert -- an -- |
| Column 9, Line 25, Claim 1 | after "surface of the" delete "collector" |
| Column 9, Line 29, Claim 1 | delete "apart;" insert -- apart -- |
| Column 10, Line 3, Claim 4 | delete "part," insert -- part -- |
| Column 10, Line 3, Claim 4 | after "adjacent the" insert -- first -- |
| Column 10, Line 21, Claim 7 | after "welded to the" insert -- first -- |
| Column 10, Line 32, Claim 9 | delete "collector" insert -- collector, -- |

Signed and Sealed this
Sixteenth Day of July, 2019

Andrei Iancu
*Director of the United States Patent and Trademark Office*